United States Patent
Perea et al.

(10) Patent No.: US 10,386,171 B1
(45) Date of Patent: Aug. 20, 2019

(54) APPARATUS FOR A DYNAMIC MULTI-AXIS HETERODYNE INTERFEROMETRIC VIBROMETER

(71) Applicant: United States of America, as represented by the Secretary of the Army, Fort Belvoir, VA (US)

(72) Inventors: James D. Perea, Alexandria, VA (US); Bradley W. Libbey, Alexandria, VA (US)

(73) Assignee: UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 28 days.

(21) Appl. No.: 15/944,825

(22) Filed: Apr. 4, 2018

(51) Int. Cl.
| | |
|---|---|
| *G01B 9/02* | (2006.01) |
| *G01H 9/00* | (2006.01) |
| *G02B 27/28* | (2006.01) |
| *G02B 27/30* | (2006.01) |

(Continued)

(52) U.S. Cl.
CPC ...... *G01B 9/02011* (2013.01); *G01B 9/02003* (2013.01); *G01B 9/02027* (2013.01); *G01B 9/02041* (2013.01); *G01H 9/00* (2013.01); *G02B 27/09* (2013.01); *G02B 27/10* (2013.01); *G02B 27/283* (2013.01); *G02B 27/288* (2013.01); *G02B 27/30* (2013.01); *G01B 2290/60* (2013.01); *G01B 2290/70* (2013.01)

(58) Field of Classification Search
CPC ............ G01B 9/02002; G01B 9/02003; G01B 9/02011; G01B 9/02041; G01B 9/02043; G01B 9/02045; G01B 2290/60; G01B 2290/70; G02B 27/09; G02B 27/10; G02B 27/283; G02B 27/288; G02B 27/30; G01H 9/00
See application file for complete search history.

(56) References Cited

U.S. PATENT DOCUMENTS

| | | |
|---|---|---|
| 4,018,531 A | 4/1977 | Leendertz |
| 4,688,940 A | 8/1987 | Sommargren et al. |
| 4,834,111 A | 5/1989 | Khanna et al. |

(Continued)

OTHER PUBLICATIONS

Perea, J. et al. "Heterodyne speckle imager for simultaneous observation of 3 degrees of vibrational freedom". Conference on Lasers and Electro-Optics, OSA Technical Digest (2016) (Optical Society of America, 2016), paper STu4H.7. (Year: 2016).*

(Continued)

*Primary Examiner* — Michael A Lyons
(74) *Attorney, Agent, or Firm* — Richard J. Kim

(57) ABSTRACT

A multi-axis heterodyne interferometer is disclosed for observations of five degrees of dynamic freedom using a single illumination source. The sensor utilizes polarization and frequency multiplexing to simultaneously observe and separate the image and Fourier planes following scattering of coherent illumination from a dynamic surface. Multiple carrier frequencies and polarizations separate two segments of a Mach-Zehnder interferometer. Segments of this interferometer have unique optical configurations to generate the image and Fourier planes simultaneously on a focal plane array. The measured irradiance contains information pertaining to an object's in-plane translation, out-of-plane rotation, and out-of-plane displacement.

19 Claims, 2 Drawing Sheets

(51) Int. Cl.
  *G02B 27/10* (2006.01)
  *G02B 27/09* (2006.01)

(56) References Cited

U.S. PATENT DOCUMENTS

| | | | |
|---|---|---|---|
| 5,011,280 A | 4/1991 | Hung | |
| 5,949,546 A * | 9/1999 | Lee | G01B 11/14 356/492 |
| 6,628,402 B1 * | 9/2003 | Yamaba | G01B 11/0608 356/489 |
| 7,242,481 B2 | 7/2007 | Shpantzer et al. | |
| 9,587,927 B2 | 3/2017 | Tan et al. | |
| 9,651,477 B1 | 5/2017 | Libbey et al. | |
| 2005/0237533 A1 * | 10/2005 | Lal | G01H 9/00 356/486 |
| 2008/0285049 A1 * | 11/2008 | Rembe | G01B 9/02045 356/497 |
| 2018/0224266 A1 | 8/2018 | Perea et al. | |

OTHER PUBLICATIONS

Kelly, D. P., Hennelly, B. M., & Sheridan, J. T., "Magnitude and direction of motion with speckle correlation and the optical fractional Fourier transform," Applied optics, vol. 44, No. 14, May 10, 2005, pp. 2720-2727.

Bhaduri, B., Quan, C., Tay, C. J., & Sjödahl, M., "Simultaneous measurement of translation and tilt using digital speckle photography," Applied optics, vol. 49, No. 18, Jun. 20, 2010, pp. 3573-3579.

Rajshekhar, G., Gorthi, S. S., & Rastogi, P., "Simultaneous measurement of in-plane and out-of-plane displacement derivatives using dual-wavelength digital holographic interferometry," Applied optics, vol. 50, No. 34, Dec. 1, 2011, pp. H16-H21.

Alvarez, A. S., Manuel, H., Santoyo, F. M., & Anaya, T. S., "Strain determination in bone sections with simultaneous 3D digital holographic interferometry," Optics and Lasers in Engineering, 57, 2014, pp. 101-108.

Saucedo-A, T., De la Torre-Ibarra, M. H., Santoyo, F. M., & Moreno, I. (2010), "Digital holographic interferometer using simultaneously three lasers and a single monochrome sensor for 3D displacement measurements," Optics express, vol. 18, No. 19, Sep. 3, 2010, pp. 19867-19875.

* cited by examiner

APPARATUS FOR A DYNAMIC MULTI-AXIS HETERODYNE INTERFEROMETRIC VIBROMETER

GOVERNMENT INTEREST

The invention described herein may be manufactured, used, sold, imported, and/or licensed by or for the Government of the United States of America.

FIELD OF THE INVENTION

The present invention relates to coherent optical vibration sensing, specifically to measure dynamic multi-axis motion of an object.

BACKGROUND OF THE INVENTION

Coherent optical vibration sensors have been investigated for use in numerous applications including strain measurements, equipment diagnostics, medical imaging, and seismic sensing. Various techniques have been utilized to observe surface motion including heterodyne laser Doppler vibrometry (e.g., U.S. Pat. No. 4,834,111 to Khanna et al.) for observation of surface velocity in the axial dimension of the interrogation beam, shearography (e.g., U.S. Pat. No. 5,011,280 to Hung) for observation of the gradient of displacement in two dimensions, electronic speckle pattern interferometry (e.g., U.S. Pat. No. 4,018,531 to Leendertz) for dynamic out of plane contour observation, and heterodyne digital image correlation for out-of-plane displacement and rotation (U.S. Pat. No. 9,651,477 to Libbey et al.). Techniques to observe the image and Fourier planes simultaneously to measure in-plane translation and out-of-plane rotation have been demonstrated using direct detection and holographic techniques. (See, e.g., Kelly, D. P., Hennelly, B. M., & Sheridan, J. T. (2005), "Magnitude and direction of motion with speckle correlation and the optical fractional Fourier transform," Applied optics, 44(14), 2720-2727; and Bhaduri, B., Quan, C., Tay, C. J., & Sjodahl, M. (2010), "Simultaneous measurement of translation and tilt using digital speckle photography," Applied optics, 49(18), 3573-3579.)

The techniques listed are generally used for observation of one or two degrees of freedom. Variations using multiple coherent beams (e.g., U.S. Pat. No. 7,242,481 B2 to Shpantzer et al.) have been used to observe three degrees of freedom, or three-dimensional deformations. (See, also, Rajshekhar, G., Gorthi, S. S., & Rastogi, P. (2011), "Simultaneous measurement of in-plane and out-of-plane displacement derivatives using dual-wavelength digital holographic interferometry," Applied optics, 50(34), H16-H21; Alvarez, A. S., Manuel, H., Santoyo, F. M., & Anaya, T. S. (2014), "Strain determination in bone sections with simultaneous 3D digital holographic interferometry," Optics and Lasers in Engineering, 57, 101-108; and Saucedo-A, T., De la Torre-Ibarra, M. H., Santoyo, F. M., & Moreno, I. (2010), "Digital holographic interferometer using simultaneously three lasers and a single monochrome sensor for 3D displacement measurements," Optics express, 18(19), 19867-19875.) It is of interest to observe in-plane and out-of-plane components of motion using a single interrogation beam.

SUMMARY OF THE INVENTION

The current invention combines elements of heterodyne Doppler vibrometers, holographic sensors, and digital image correlation to acquire light scattered from a dynamic surface. The apparatus simultaneously collects magnitude and phase of a light field at the image and Fourier planes. Information contained in the magnitude and phase of these complex measured fields provides the ability to observe five degrees of freedom including in-plane translation, out-of-plane rotation, and out-of-plane displacement using a single coherent illumination source.

The invention observes a dynamic object by mixing optical field data with heterodyne reference beams and collecting these combined fields at image and Fourier planes. The apparatus utilizes a receive Mach-Zehnder interferometer in which each segment contains a different optical configuration. One segment produces a focused image of the electric field scattered off the object while the other segment produces an optical Fourier transform of the electric field scattered off the object, these are the receive paths. The image and Fourier planes are simultaneously sensed on a pixelated focal plane array, but are separable because each segment of the receive interferometer is orthogonally polarized and modulated at distinct frequencies. Two reference paths contain acousto-optic modulators to create two intermediate frequencies and optical components to orthogonally polarize these paths. These two reference light paths are recombined and aligned on a common exit path. Mixing the reference and measurement fields on a high-speed focal plane array creates an interference pattern with two carrier frequencies. Each carrier contains information pertaining to one segment of the receive interferometer. Each segment is Doppler shifted due to the object's time varying path length in the axial direction of the interrogation beam. In the segment representing the Fourier plane, the measurement field shifts laterally due to out-of-plane rotation while the phase contains a linear variation proportional to the object's in-plane translation and an additional Doppler shift due to out-of-plane rotation. In the segment representing the image plane, the measurement field shifts laterally due to in-plane translation while the phase contains a linear variation proportional to the object's out-of-plane rotation.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
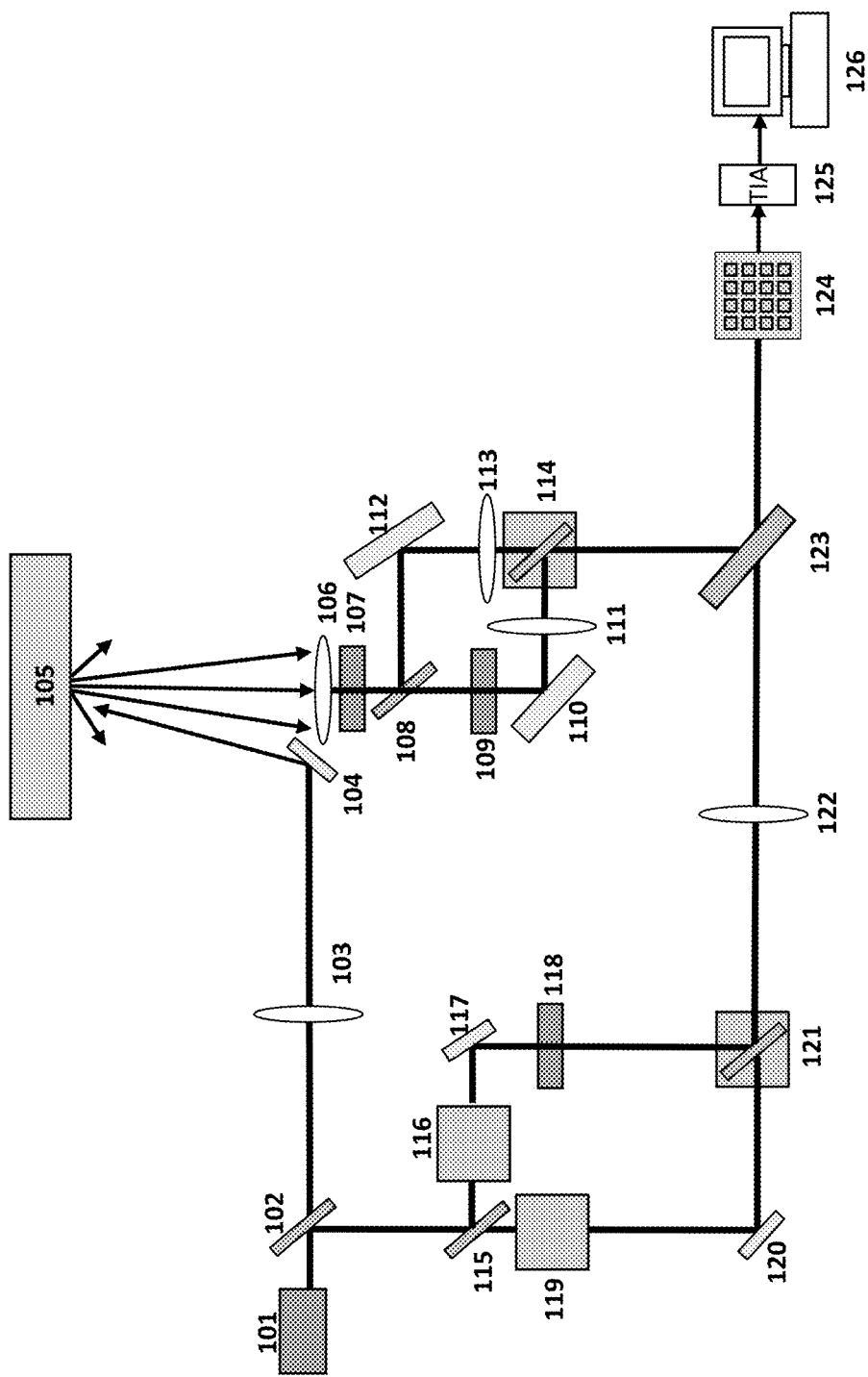
FIG. 1 shows an exemplary laboratory sensor schematic for a multi-axis heterodyne interferometric vibrometer.
Figure 2:
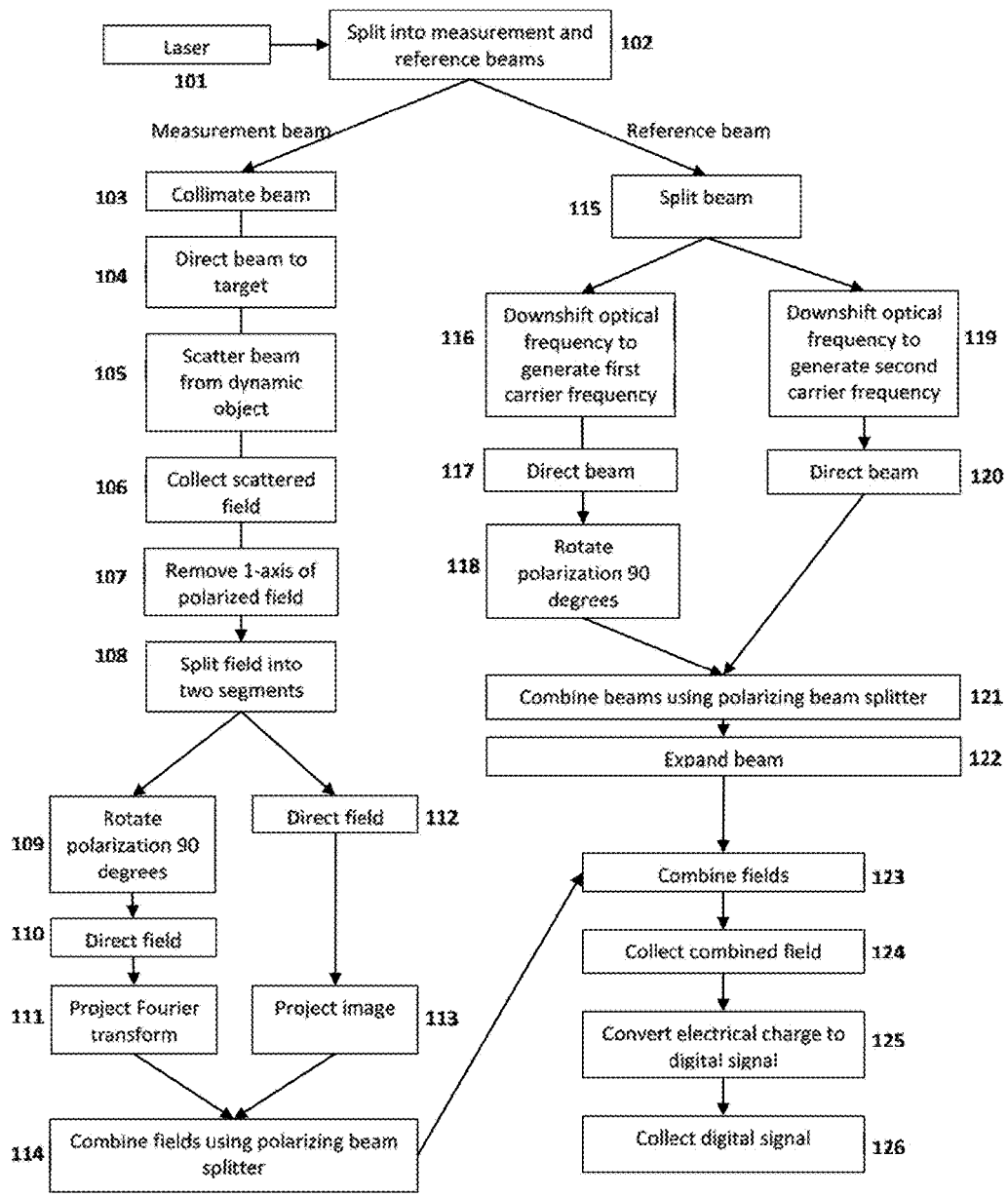
FIG. 2 shows an exemplary block diagram illustrating the sensor process of the multi-axis heterodyne interferometric vibrometer shown in FIG. 1.

An exemplary multi-axis heterodyne interferometric vibrometer is represented in FIG. 1, and its exemplary process is shown in FIG. 2. FIG. 1 shows schematic of the multi-axis heterodyne interferometric vibrometer with a dynamic diffuse-scatterer for the target. Specifically, shown in FIG. 1 are: 101, 532 nm laser source; 102, 50:50 beam splitter; 103, beam collimator; 104, mirror; 105, dynamic diffuse scatterer; 106, 100 mm focal length collecting lens; 107, polarizing filter; 108, 50:50 beam splitter; 109, half wave plate; 110, mirror; 111, 125 mm focal length converging lens; 112, mirror; 113, 100 mm focal length converging lens; 114, 50:50 polarizing beam splitter; 115, 50:50 beam splitter; 116, 10 kHz acousto-optic modulator (AOM); 117, mirror; 118, half wave plate; 119, 15 kHz AOM; 120, mirror; 121, 50:50 polarizing beam splitter; 122, −25 mm focal length diverging lens; 123, 70:30 beam splitter; 124, 512× 512 pixel focal plane array sampling 40,000 frames per second (FPS); 125, trans-impedance amplifier; 126, computer. FIG. 2 shows the block diagram corresponding to the sensor schematic in FIG. 1.

An exemplary laser source is a horizontally polarized laser 101. A splitter 102 divides the source into a probe and reference beams. In the probe beam path, a series of lenses 103 collimate the beam, and mirror 104 directs the beam to an object 105. The object's surface is rough on the scale of an optical wavelength and vibrates as a rigid body. The probe beam scatters from the moving object 105; the resulting field now has a random spatial phase, amplitude, and polarization. The purpose of the invention is to capture the phase and amplitude information in order to track the surface's position. As the object moves, a Doppler phase shift is imparted due to the optical path length change near the object plane 105, while linear phase shifts and field translation occur due to out-of-plane rotation and in-plane translation. The optical field at the object is modified by a phase associated with the new position of the object, $$u_o(\xi, \eta, z) \to u_o(\xi - \Delta\xi, \eta - \Delta\eta, z) e^{j\frac{A\pi}{\lambda}(\theta\xi + \gamma\eta)} e^{-j\frac{A\pi}{\lambda}\Delta z}, \quad (1)$$

where $\xi, \eta$ are the in-plane coordinates in the object plane; $z$ is the out-of-plane coordinate; $\Delta\xi$, $\Delta\eta$, and $\Delta z$ are the object displacements respectively; $\theta$, $\gamma$ are the components of rotation about the $\eta$, $\xi$ axes; and $\lambda$ is the optical wavelength. $u_o$ represents a random, complex, optical field caused by scattering from the object.

Some of the resulting scattered radiation is collected by a single 100 mm focal length lens 106. The field propagates through a dichroic polarizing filter 107 where the vertically polarized radiation is absorbed. A splitter 108 divides the field into two segments. A half wave plate 109 rotates one segment's polarization 90 degrees creating a vertically polarized field. A mirror 110 directs the vertically polarized field to a 125 mm focal length lens 111. Lens 111 converges the vertically polarized field and produces an image of the Fourier plane produced by lens 106. The vertically polarized, converging field propagates to the polarizing beam splitter 114 which combines the vertically polarized field with a horizontally polarized field from the splitter 108. The horizontally polarized field leaves splitter 108 and is redirected by mirror 112 to a 100 mm focal length lens 113. Lens 113 produces an image of the image plane produced by lens 106. Other combinations of focal lengths may be used as long as certain criteria are met. The focal length of lens 106 should be equivalent to ½ the distance between lens 106 and object 105. In this case, a virtual image plane is produced at two focal lengths from lens 106 and a virtual Fourier plane is produced at one focal length from lens 106. The focal length of lens 111 should be chosen to image the virtual Fourier plane on the focal plane array, 124. The focal length of lens 113 should be chosen to image the virtual image plane on the focal plane array, 124. The combined fields leave splitter 114 and propagate to a non-polarizing splitter 123 as a combined probe field.

Following initial propagation through the beam splitter 102, the reference beam propagates to a splitter 115 dividing the beam into two reference beams. Each beam propagates through an acousto-optic modulator (AOM), 116 and 119. AOM 116 shifts the frequency by one carrier frequency $\omega_f$, upshifting the optical carrier by 10 kHz. A mirror 117 directs the beam to a half wave plate 118 which rotates the polarization 90 degrees, creating a vertically polarized beam. The beam then propagates to a polarizing beam splitter 121. AOM 119 shifts the frequency by another carrier frequency $\omega_i$, upshifting the optical carrier by 15 kHz. Other combinations of carrier frequencies may be chosen, provided the FPA frame rate meets the Nyquist sampling criteria. A mirror 120 directs the beam to the polarizing beam splitter 121 that combines the beams. The combined reference beam propagates to a lens 122 which expands the beam. The reference beam propagates to the non-polarizing splitter 123 where it is combined with the probe field from the polarizing beam splitter 114.

Splitter 123 combines the reference beam and probe field and projects them to the focal plane array 124 which transduces the irradiance of the field into an electrical charge proportional to the irradiance. A trans-impedance amplifier circuit 125 converts charge from the focal plane array 124 into a digital representation of the irradiance on a computer 126. Elements 124, 125, and 126 are capable of repeating the irradiance collection process to capture the dynamic changes of the object and carrier frequencies imposed on the reference beam thus producing image frames. Each frame, representing irradiance, can be described by $$I(x,y,t) = |R_f|^2 + |R_i|^2 + |M_f(x,y,t)|^2 + |M_i(x,y,t)|^2 + 2|R_f||M_f(x,y,t)|\cos[\omega_f t + \psi_f(x,y,t)] + 2|R_i||M_i(x,y,t)|\cos[\omega_i t + \psi_i(x,y,t)], \quad (2)$$

where $|R_f|$, $|R_i|$ are the reference segments' magnitudes, and $\omega_f$, $\omega_i$ are the reference segments' carrier frequencies. $|M_f|$, $|M_i|$ represent the Fourier transform and image magnitudes of object 105 respectively. $\psi_f$, $\psi_i$ represent the Fourier transform and image phases of object 105 respectively; these phase signals are carried on $\omega_f$ and $\omega_i$ respectively. Polarization is essential to this invention because the mixed signal terms, $2|R_f||M_f|\cos[\omega_f t + \psi_f]$ and $2|R_i||M_i|\cos[\omega_i t + \psi_i]$, are separable due to their unique carrier frequency. Equally important is that the measurement is not confounded by cross terms: $R_f$ does not mix with $M_i$ and likewise $R_i$ does not mix with $M_f$. The essence of this invention is that the irradiance data is separable into Fourier plane complex-field data and image plane complex-field data.

$|M_f|$ shifts laterally due to out-of-plane rotation while $|M_i|$ shifts laterally due to in-plane translation. $\psi_f$ contains Doppler spatially-uniform shift due to out-of-plane displacement and out-of-plane rotation of the object 105 and contains a linear spatial phase term due to the object's in-plane translation. $\psi_i$ contains Doppler shift due to out-of-plane displacement of the object 105 and a linear spatial phase term due to the out-of-plane rotation.

It is obvious that many modifications and variations of the present invention are possible in light of the above teachings. It is therefore to be understood that within the scope of the appended claims, the invention may be practiced otherwise than as described.

What is claimed is:

1. A multi-axis heterodyne interferometric vibrometer, comprising:
   a laser source emitting a polarized laser;
   a first beam splitter to divide said polarized laser into a probe path to provide a measurement beam and a reference path to provide a reference beam;
   a series of lenses to collimate the measurement beam in the probe path;
   a first measurement mirror to direct the measurement beam as collimated to a target object, the target object having a vibrating rough surface to scatter the directed measurement beam as scattered radiation;

a collecting lens to collect a portion of the scattered radiation as a collected field;

a measurement polarizing filter to filter the collected field to result in a horizontally-polarized collected field;

a first measurement beam splitter to divide the horizontally-polarized collected field into a horizontally-polarized first probe field and a horizontally-polarized second probe field;

a first measurement half wave plate to rotate polarization of the horizontally-polarized first probe field 90 degrees as a vertically-polarized field;

a second measurement mirror to redirect the vertically-polarized field as a redirected vertically-polarized field;

a converging lens to image a Fourier plane of the redirected vertically-polarized field as a Fourier-plane vertically-polarized field;

a third measurement mirror to redirect the horizontally-polarized second probe field as a horizontally-polarized field;

a converging lens to image an image plane of the horizontally-polarized field as an image-plane horizontally-polarized field;

a second measurement polarizing beam splitter to combine the Fourier-plane vertically-polarized field and the image-plane horizontally-polarized field as a combined probe field;

a first reference beam splitter to divide the reference beam into a horizontally-polarized first reference beam and a horizontally-polarized second reference beam;

a first acousto-optic modulator to frequency shift the horizontally-polarized first reference beam by a first carrier frequency as a frequency-shifted first reference beam;

a first reference mirror to redirect the frequency-shifted first reference beam as a redirected first reference beam;

a first reference half wave plate to rotate the redirected first reference beam 90 degrees as a vertically-polarized first reference beam;

a second acousto-optic modulator to frequency shift the horizontally-polarized second reference beam by a second carrier frequency as a frequency-shifted horizontally-polarized second reference beam;

a second reference mirror to reflect the frequency-shifted second reference beam as a redirected horizontally-polarized second reference beam;

a second reference polarizing beam splitter combines the redirected horizontally-polarized second reference beam and the vertically-polarized first reference beam as a combined reference beam;

a diverging lens which expands the combined reference beam as an expanded reference beam;

a non-polarizing splitter which combines the expanded reference beam and the combined probe field as a projected field;

a focal plane array to transduce irradiance of the projected field and output electrical charges;

a trans-impedance amplifier to convert the electrical charges into digital signals; and a computer to receive and process the digital signals for characterizing dynamic changes of the target object.

2. The multi-axis heterodyne interferometric vibrometer as recited in claim 1, wherein said laser source is a horizontally polarized laser.

3. The multi-axis heterodyne interferometric vibrometer as recited in claim 1, wherein said collecting lens produces a Fourier plane and an image plane.

4. The multi-axis heterodyne interferometric vibrometer as recited in claim 1, wherein said measurement polarizing filter is a dichroic polarizing filter to absorb a vertically polarized portion of said collected field.

5. The multi-axis heterodyne interferometric vibrometer as recited in claim 1, wherein said computer receives the digital signals representing the irradiance of the projected field for processing information pertaining to said target object's in-plane translation, out-of-plane rotation, and out-of-plane displacement.

6. The multi-axis heterodyne interferometric vibrometer as recited in claim 1, wherein said computer receives and processes the digital signals to produce an image frame representation of dynamic changes of the target object.

7. The multi-axis heterodyne interferometric vibrometer as recited in claim 6, wherein said digital signals represent the irradiance of the projected field, and are repeatedly collected for digital signal processing by the computer to produce image frames that capture changes in the object's position.

8. A multi-axis heterodyne interferometric vibrometer sensor process, comprising the steps of:

emitting a horizontally polarized laser by a laser source as a source laser;

a first beam splitter dividing said emitted laser into a probe beam and a reference beam;

collimating the probe beam using a beam collimator as a collimated beam;

directing the collimated beam as a measurement beam using a first measurement mirror to a target that is a dynamic object having an optically coarse surface that is vibrating;

scattering the measurement beam from the optically coarse surface of the dynamic object as scattered radiation;

collecting a portion of the scattered radiation as a collected field using a collecting lens;

filtering the collected field using a first measurement dichroic polarizing filter;

dividing the collected field as filtered into a horizontally-polarized first probe field and a horizontally-polarized second probe field;

rotating the horizontally-polarized first probe field's polarization by 90 degrees using a first measurement half wave plate, resulting in a vertically-polarized field;

redirecting the vertically-polarized field as a redirected vertically-polarized field using a second measurement mirror;

imaging a Fourier plane of the redirected vertically-polarized field using a converging lens, resulting in a Fourier-plane vertically-polarized field;

redirecting the horizontally-polarized second probe field as a horizontally-polarized field using a third measurement mirror;

imaging an image plane of the horizontally-polarized field using a converging lens, resulting in an image-plane horizontally-polarized field;

combining the Fourier-plane vertically-polarized field and the image-plane horizontally-polarized field as a combined probe field using a second measurement polarizing beam splitter;

splitting the reference beam using a first reference beam splitter into a horizontally-polarized first reference beam and a horizontally-polarized second reference beam;

frequency shifting the horizontally-polarized first reference beam by a first carrier frequency as a frequency-shifted first reference beam using a first acousto-optic modulator;

redirecting the frequency-shifted first reference beam as a redirected first reference beam using a first reference mirror;

rotating polarization of the redirected first reference beam 90 degrees as a vertically-polarized first reference beam using a first reference half wave plate;

frequency shifting the horizontally-polarized second reference beam by a second carrier frequency as a frequency-shifted second reference beam using a second acousto-optic modulator;

redirecting the frequency-shifted second reference beam as a redirected horizontally-polarized second reference beam using a second reference mirror;

combining the redirected horizontally-polarized second reference beam and the vertically-polarized first reference beam as a combined reference beam using a second reference polarizing beam splitter;

expanding the combined reference beam as an expanded reference beam using a diverging lens;

combining the expanded reference beam and the combined probe field as a projected field using a second non-polarizing beam splitter;

transducing an irradiance of fields associated with the projected field into an electrical charge proportional to the irradiance using a focal plane array to output electrical charges;

converting said electrical charges from the focal plane array as digital signals for collection; and processing on a computer the digital signals as collected to capture dynamic changes of the target and carrier frequencies imposed on the reference beam, and output image frames.

9. The multi-axis heterodyne interferometric vibrometer sensor process as recited in claim 8, wherein collecting a portion of the scattered radiation as a collected field using a collecting lens produces a Fourier plane and an image plane.

10. The multi-axis heterodyne interferometric vibrometer sensor process as recited in claim 8, wherein filtering the collected field using a first measurement dichroic polarizing filter absorbs a vertically polarized radiation component of the collected field.

11. The multi-axis heterodyne interferometric vibrometer sensor process as recited in claim 8, wherein said imaging the redirected vertically-polarized field using a converging lens results in a Fourier-plane vertically-polarized field and produces an image of a Fourier plane of the collected field on the focal plane array.

12. The multi-axis heterodyne interferometric vibrometer sensor process as recited in claim 8, wherein said imaging the horizontally-polarized field using a converging lens results in an image-plane horizontally-polarized field and produces an image of an image plane of the collected field on the focal plane array.

13. The multi-axis heterodyne interferometric vibrometer sensor process as recited in claim 8, wherein frequency shifting the first reference beam frequency upshifts by a first carrier frequency.

14. The multi-axis heterodyne interferometric vibrometer sensor process as recited in claim 8, wherein frequency shifting the second reference beam frequency upshifts by a second carrier frequency.

15. The multi-axis heterodyne interferometric vibrometer sensor process as recited in claim 8, wherein rotation of polarization occurs on the first reference beam but not the second reference beam.

16. The multi-axis heterodyne interferometric vibrometer sensor process as recited in claim 8, wherein as the target object moves, a Doppler phase shift is imparted, while linear phase shifts and field translation occur due to out-of-plane rotation and in-plane translation.

17. The multi-axis heterodyne interferometric vibrometer sensor process as recited in claim 8, wherein said digital signals are received to produce an image frame representing the irradiance, described by $$I(x,y,t)=|R_f|^2+|R_i|^2+|M_f(x,y,t)|^2+|M_i(x,y,t)|^2+2|R_f||M_f(x,y,t)|\cos[\omega_f t+\psi_f(x,y,t)]+2|R_i||M_i(x,y,t)|\cos[\omega_i t+\psi_i(x,y,t)],$$

wherein, $|R_f|$, $|R_i|$ are reference segments' magnitudes, and $\omega_p$, $\omega_i$ are the reference segments' carrier frequencies; and wherein $|M_f|$, $|M_i|$ represent Fourier transform and image magnitudes of the target object, respectively.

18. The multi-axis heterodyne interferometric vibrometer sensor process as recited in claim 17, wherein $$2|R_f||M_f|\cos[\omega_f t+\psi_f] \text{ and } 2|R_i||M_i|\cos[\omega_i t+\psi_i],$$

are separable mixed signal terms due to the respective carrier frequencies, whereby irradiance data are separable into Fourier plane complex-field data and image plane complex-field data.

19. The multi-axis heterodyne interferometric vibrometer sensor process as recited in claim 17, wherein $|M_f|$ shifts laterally due to out-of-plane rotation while $|M_i|$ shifts laterally due to in-plane translation, $\psi_f$ contains Doppler spatially-uniform shift due to out-of-plane displacement and out-of-plane rotation of the target object and contains a linear spatial phase term due to the target object's in-plane translation, and $\psi_i$ contains Doppler shift due to out-of-plane displacement of the target object and a linear spatial phase term due to the out-of-plane rotation.

* * * * *